(12) United States Patent
Alfonso

(10) Patent No.: US 12,210,095 B1
(45) Date of Patent: Jan. 28, 2025

(54) SYSTEMS AND METHODS FOR INTEGRATING SPATIAL AUDIO INTO POINT CLOUDS

(71) Applicant: Illuscio, Inc., Culver City, CA (US)

(72) Inventor: Pedro Alfonso, Austin, TX (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/412,670

(22) Filed: Jan. 15, 2024

(51) Int. Cl.
*G01S 15/89* (2006.01)

(52) U.S. Cl.
CPC ...... *G01S 15/8993* (2013.01); *G01S 15/8995* (2013.01)

(58) Field of Classification Search
CPC ............. G01S 15/8993; G01S 15/8995; G01S 15/8977; G01S 15/8965; G01S 15/8968; G01S 15/897; G01S 15/8975; G01S 15/8959; G01S 15/8961; G01S 15/8963; G01S 15/895; G01S 15/8913; G01S 15/8911; G01S 15/8915; G01S 15/8929; G01S 15/8918; G01S 15/892; G01S 15/8922; G01S 15/8925; G01S 15/8927
See application file for complete search history.

(56) References Cited

U.S. PATENT DOCUMENTS

| | | | |
|---|---|---|---|
| 11,567,195 B2 * | 1/2023 | Booij | G01S 5/30 |
| 2018/0284224 A1 * | 10/2018 | Weed | G01S 17/42 |
| 2018/0284231 A1 * | 10/2018 | Russell | G01S 7/489 |
| 2018/0284239 A1 * | 10/2018 | LaChapelle | G01S 17/10 |
| 2018/0284242 A1 * | 10/2018 | Campbell | G01S 17/42 |
| 2018/0284246 A1 * | 10/2018 | LaChapelle | H01L 27/14643 |
| 2018/0284276 A1 * | 10/2018 | Campbell | G01S 7/4817 |
| 2018/0284278 A1 * | 10/2018 | Russell | G01S 17/89 |
| 2018/0284284 A1 * | 10/2018 | Curatu | G01S 17/89 |
| 2019/0128739 A1 * | 5/2019 | Stuart | G01S 15/89 |
| 2019/0242978 A1 * | 8/2019 | Weed | G01S 7/4817 |
| 2021/0048526 A1 * | 2/2021 | Booij | G01S 5/0009 |
| 2022/0082691 A1 * | 3/2022 | Prabhakar | G01S 15/58 |
| 2022/0146668 A1 * | 5/2022 | Stuart | G06T 7/33 |
| 2023/0021829 A1 * | 1/2023 | Booij | G01S 5/02528 |
| 2024/0152663 A1 * | 5/2024 | Booij | G01S 5/183 |

* cited by examiner

*Primary Examiner* — Daniel L Murphy
*Assistant Examiner* — Amie M Ndure
(74) *Attorney, Agent, or Firm* — Ansari Katiraei LLP; Arman Katiraei; Sadiq Ansari

(57) ABSTRACT

Spatial audio integrated point clouds expand the definition of point cloud points to include acoustic characteristics in addition to positional coordinates for the positioning of the points in a three-dimensional (3D) space and visual characteristics for how the individual points are presented at their respective positions in the 3D space. A system may generate a 3D scene based on the positioning of the points, and may track a path for sound that is emitted from a sound source. The system determines that the path reaches a position of one or more of the points, and performs a first adjustment to the sound according to the defined acoustic characteristics of the one or more points.

20 Claims, 9 Drawing Sheets

SYSTEMS AND METHODS FOR INTEGRATING SPATIAL AUDIO INTO POINT CLOUDS

BACKGROUND

Realistically simulating sound in a digital three-dimensional (3D) scene or environment involves accounting for the positioning, shape, and acoustic characteristics of different 3D objects within the 3D scene or environment and/or the positioning, and how the positioning, shape, and acoustic characteristics of the 3D objects affect sound traveling from a sound source to a listener. The 3D objects may block, distort, interfere, or otherwise adjust the sound that originates from the sound source before it reaches the listener. Accordingly, the sound heard by the listener may differ from the sound originated by the sound source due to reflections, reverberations, attenuations, and/or other sound effects the 3D objects impart on the sound as it travels from the sound source to the listener.

Spatial audio engines, application programming interfaces (APIs), and/or other systems have been developed to realistically simulate the effects that 3D objects defined with connected sets of meshes or polygons have on sound. However, point clouds are an entirely different 3D format than the mesh-based 3D objects.

Point clouds create 3D objects using a highly dense distribution of disconnected points in a 3D space. In other words, point clouds are defined with entirely different primitives than the mesh-based 3D objects or 3D models.

The existing spatial audio engines, APIs, and/or other systems for simulating or recreating sound effects in a 3D scene or environment constructed with connected sets or meshes and/or polygons are incompatible with point clouds and the point primitives. Specifically, the algorithms and techniques of the existing systems cannot be used to determine how sound is affected by points in the path between a sound source and a listening position.

DETAILED DESCRIPTION OF PREFERRED EMBODIMENTS

The following detailed description refers to the accompanying drawings. The same reference numbers in different drawings may identify the same or similar elements.

Provided are systems and associated methods for integrating spatial audio into point clouds. The spatial audio integration involves expanding the definition of the point cloud points to include acoustic characteristics in addition to positional coordinates for the positioning of the points in a three-dimensional (3D) space and visual characteristics for how the individual points are presented at their respective positions in the 3D space. The acoustic characteristics define the reactivity, interactivity, and/or effects that the individual points have on sound that reaches, reflects, propagates to, travels past, and/or otherwise contacts the points at their respective positions in the 3D space. In other words, the visual and acoustic characteristics of one or more 3D objects may be defined and/or contained entirely within a single point cloud and existing data defined for the points (e.g., positional data, material properties, etc.) may be reused or combined with the acoustic characteristics for an accurate simulation of sound in a 3D scene or environment that is constructed with points of one or more point clouds.

For computational efficiency, similar acoustic characteristics of a neighboring set of points may be combined and used to define a multi-point sound primitive. The multi-point cloud primitive may represent the acoustic characteristics of the neighboring set of points and may be defined with a shape or form that spans the positions of the neighboring set of points. A point cloud audio system may compute the effects that the single multi-point cloud primitive imparts on sound reaching any position about the single multi-point cloud primitive rather than individually compute the effects that each point in the neighboring set of points contacted by the sound has on the sound when the sound is a wave or simulated in the 3D scene or environment as a traveling spatial element that contacts or is affected by several of the points at the same time or slightly different times.

Figure 1:
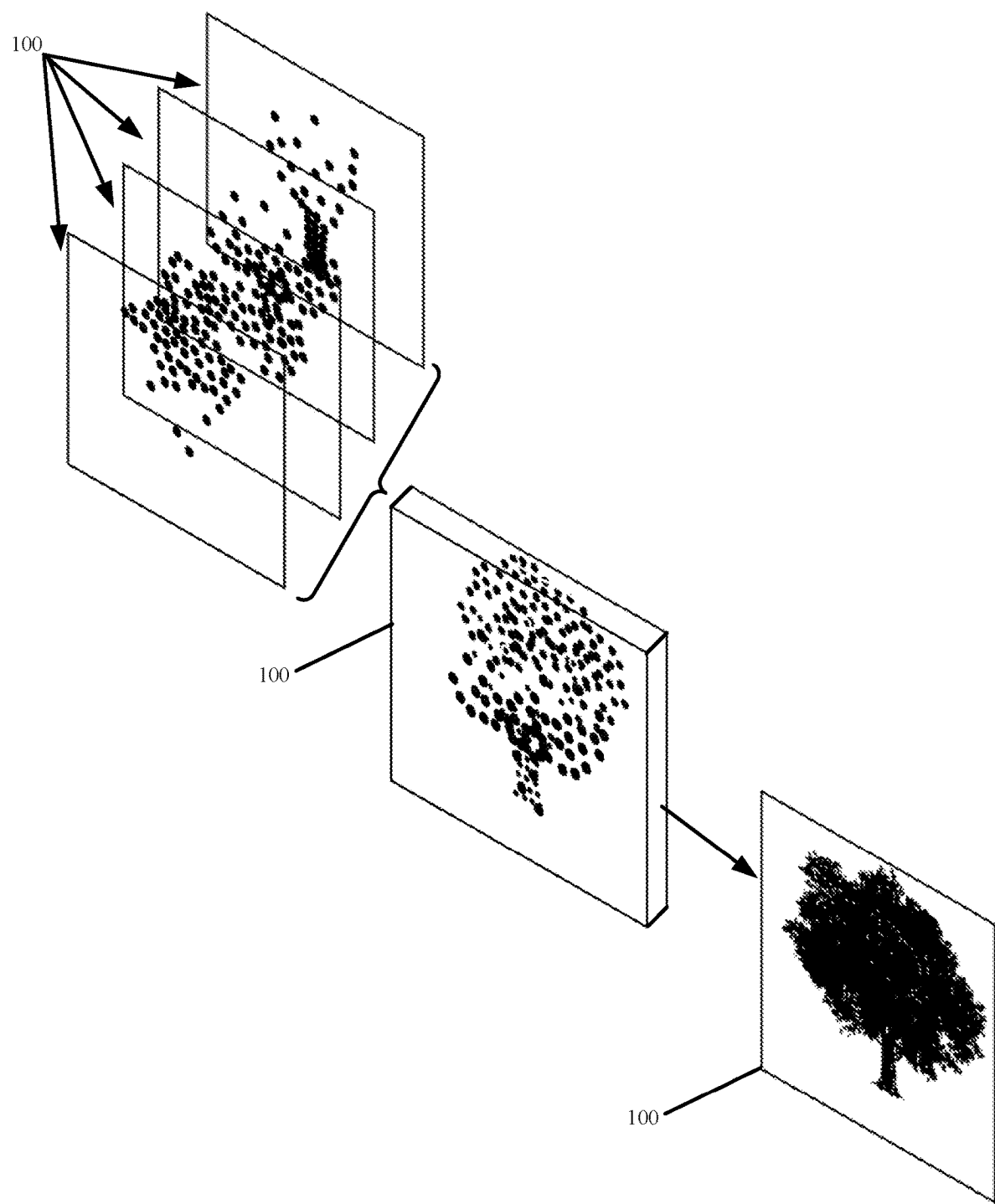
FIG. 1 illustrates an example point cloud in accordance with some embodiments presented herein.

FIG. 1 illustrates an example point cloud 100 in accordance with some embodiments presented herein. Point cloud 100 may represent a 3D object or a 3D scene with points that are distributed in a 3D space to collectively generate the shape and visual characteristics of the 3D object or scene.

The points of point cloud 100 differ from pixels of a 2D image because certain regions of point cloud 100 may have no points, lower densities of points, and/or higher densities of points based on varying amounts of visual information that is defined, detected, or scanned at those regions. Additionally, the position of the point cloud points may be defined in 3D space using x, y, and z coordinate values. In contrast, pixels of a 2D image are defined in 2D space and have a uniform density or fixed arrangement that is defined by the resolution of the 2D image. In other words, the point cloud points may have a non-uniform placement or positioning, whereas the 2D image may have pixel data for each pixel of a defined resolution (e.g., 640×480, 800×600, etc.).

The points of point cloud 100 also differ from meshes or polygons of a 3D mesh model in that the points are disconnected from one another whereas the meshes or polygons are connected in order to create the shape or form of a represented 3D object. Moreover, the meshes or polygons may be stretched or skewed to change the overall shape of the represented 3D object, whereas the points are typically of a fixed size and/or shape.

Each point cloud point may be defined with a plurality of elements. The plurality of elements may include a first set of positional elements and a second set of non-positional or descriptive elements.

The positional elements may be defined with coordinates in a 3D space. For instance, each point cloud point may include x-coordinate, y-coordinate, and z-coordinate elements to capture the position of an imaged surface, feature, or article of the 3D object or the 3D environment in the 3D space.

The positional elements may also include one or more normals. The one or more normals may correspond to a surface normal and/or an audio normal.

The surface normal defines the angle, direction, or orientation that the surface, feature, or article of the 3D object or the 3D environment represented by a point cloud point faces or is exposed to. More specifically, the surface normal for a particular point is a line, ray, or vector that is perpendicular to the surface, feature, or article represented by that particular point.

The audio normal represents the one or more angles, directions, or forms with which sound reflects off of a point. For instance, the audio normal of a first point may reflect sound by changing the angle at which the sound reaches the first point with a particular angular offset, and the audio normal of a second point may reflect sound by generating a waveform, curve, or other form with which the sound reflects off the second point. Accordingly, the audio normal may be defined as multiple lines, rays, vectors, or angles.

In some embodiments, the surface normal and the audio normal are one and the same. In other words, the same defined normal may be used to indicate the outward facing direction of a point and the direction that sound reflects off the point. In some other embodiments, the surface normal and the audio normal may be different based on the acoustic characteristics of the point reflecting sound in different directions than the surface normal of the point.

The non-positional elements may include information about the detected characteristics of the surface, feature, or article imaged at a corresponding position in the 3D space. The characteristics may correspond to a detected color. The color may be represented using red, green, blue (RGB), and/or other values. In some embodiments, the characteristics may provide the chrominance, hardness, translucence, reflectivity, luminance, metallic characteristics, roughness, specular, diffuse, albedo, index of refraction (IOR), and/or other properties of the imaged surface, feature, or article. In some embodiments, the non-positional elements may directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic".

In some embodiments, the characteristics may be related to properties of the device used to generate each of the points. For instance, the characteristics may include a Tesla strength value to quantify the strength of the magnetic field that was used in detecting and/or imaging the surface, feature, or article represented by a particular point cloud point. In some embodiments, the non-positional elements may include energy, audio or sound, and/or other characteristics of the device or the object being imaged. Accordingly, the non-positional elements can include any property of the imaged surface, feature, or article (e.g., hue, saturation, brightness, reflectivity, etc.) or of the device used to capture the object part at a corresponding point in the 3D space.

In order to integrate the spatial audio into the point cloud definition, the non-positional elements of a point may be expanded and/or defined with one or more elements for the acoustic characteristics of the surface, feature, or article represented by that point. The acoustic characteristics may specify the reactivity, interactivity, and/or effects that the point has on sound reaching or contacting the point. For instance, the acoustic characteristics may specify absorbing a first set of sound frequencies, reflecting a second set of sound frequencies, and adjusting or distorting a third set of sound frequencies that continue through or past the point position. Effects relating to the reverberation, attenuation, phasing, modulation, reflection, and/or other changes to sound may be defined in the acoustic characteristics and may be defined as affecting certain sound frequencies, pitches, tones, and/or other sound properties.

In some embodiments, the acoustic characteristics may be defined or based on other non-positional elements of a point. For instance, the material or material property defined for a point may be associated with or mapped to a set of acoustic characteristic. As a specific example, a first point defined with the material of "wood" may be associated with a first set of acoustic characteristics, and a sound point defined with the material of "metal" may be associated with a different second set of acoustic characteristics. Sound that reaches the first point is adjusted differently than sound that reaches the second point based on the first set of acoustic characteristics associated with the first point and the second set of acoustic characteristics associated with the second point. Similarly, a point defined with the material property of "rigid" or "solid" may impart a first adjustment to a defined reflection acoustic characteristic (e.g., increase the amount of sound that is reflected), whereas a point defined with the material property of "flexible" or "perforated" may impart a second adjustment to the defined reflection acoustic characteristic (e.g., decrease the amount of sound that is reflected).

Accordingly, each point cloud point may include or may be defined with an array of elements. The array of elements may provide the positioning of the point in the 3D space as well as one or more visual and/or acoustic characteristics of that point. For instance, a point cloud point may be stored and/or represented as an array of elements with some combination of x-coordinate, y-coordinate, z-coordinate, red, green, blue, chrominance, hardness, translucence, reflectivity, luminance, metallic characteristics, roughness, specular, diffuse, albedo, IOR, tesla, sound reflectivity, sound attenuation, sound reverberation, and/or other sound effects for all or different frequencies.

Point cloud 100 and the individual points of point cloud 100 may be generated by a 3D or depth-sensing camera, Light Detection and Ranging (LiDAR) sensor, Magnetic Resonance Imaging (MRI) device, Positron Emission Tomography (PET) scanning device, Computerized Tomography (CT) scanning device, time-of-flight device, and/or other imaging equipment for 3D objects, volumetric objects, or 3D environments. Point cloud 100 may be generated from output of two or more devices. For instance, a first imaging device (e.g., a LiDAR sensor) may determine the position for each point in the 3D space, and a second imaging device (e.g., a high-resolution camera) may measure or capture the characteristics or other non-positional information for each point. One or more photogrammetry techniques may be used to consolidate the data from the first imaging device and the second imaging device, and to create point cloud 100.

Figure 2:
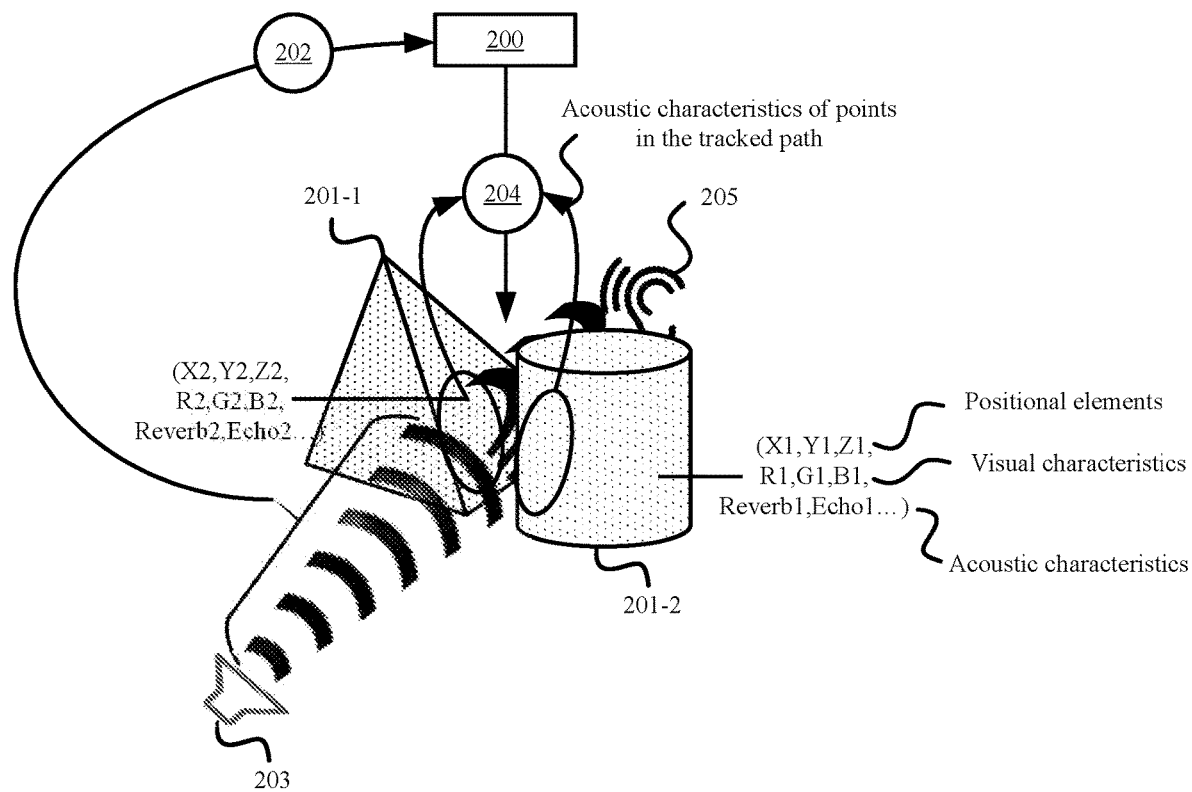
FIG. 2 illustrates an example of creating a three-dimensional (3D) scene with spatial audio integrated point clouds in accordance with some embodiments presented herein.

FIG. 2 illustrates an example of creating a 3D scene with spatial audio integrated point clouds in accordance with some embodiments presented herein. Each spatial audio integrated point cloud 201-1 and 201-2 (hereinafter collectively referred to as "spatial audio integrated point clouds 201" or individually as "spatial audio integrated point cloud 201") represents a 3D object with a disconnected and distributed set of points. The points of each spatial audio integrated point cloud 201 are defined with 3D positions or coordinates, visual characteristics, and acoustic characteristics.

Spatial audio integrated point clouds 201 are positioned within the 3D scene. Spatial audio integrated point clouds 201 may populate the 3D scene with moveable characters or interactive elements of a game as well as static objects (e.g., buildings). Accordingly, the 3D scene may be generated for an interactive 3D game, virtual reality, mixed reality, or augmented reality environment, and/or a 3D animation or video.

One or more sound sources 203 may be defined within the 3D scene. Sound source 203 may correspond to any object or element in the 3D scene that generates or originates sound. For instance, sound source 203 may be a speaking character, sound from environmental elements (e.g., moving vehicles, weapons firing, wind, etc.), and/or sound effects (e.g., explosions, sounds for objects colliding with one another, etc.).

The 3D scene also includes listening position 205. Listening position 205 is the position in the 3D scene where the sounds from sound source 203 and other sound sources are heard. Listening position 205 may be the position of a playable character in a game or may be the position at which the 3D scene is rendered for a first-person game, virtual reality environment, or 3D animation. Accordingly, listening position 205 may correspond to the position of a virtual camera.

Accurate simulation or realistic recreation of the sound in the 3D scene involves accounting for the effects that spatial audio integrated point clouds 201 have on the sound from sound source 203 as the sound travels or propagates to listening position 205. For instance, spatial audio integrated point clouds 201 placed in between the path of the sound from sound source 203 to listening position 205 may impart different reverberations, reflections, attenuations, and/or other effects on the sound based on the acoustic characteristics defined for the points that are in the path of the sound and that the sound passes through or reflects off of. The surface normals defined for the points may specify the angle or direction at which the sound reflects off the points.

Point cloud sound system 200 calculates and/or tracks (at 202) the path of the sound from sound source 203 to listening position 205 via a mathematical modeling of sound propagation and by accounting for the audio normals of the points in the path that may change the direction or reflection of the sound. Additionally, point cloud sound system 202 adjusts (at 204) the sound according to the acoustic characteristics of the points in the tracked path to listening position 205. Point cloud sound system 200 recreates the sound at listening position 205 by playing the sound that is adjusted (at 204) along the computed path by the acoustic characteristics of the points in the path rather than the original sound originating from sound source 203.

Figure 3:
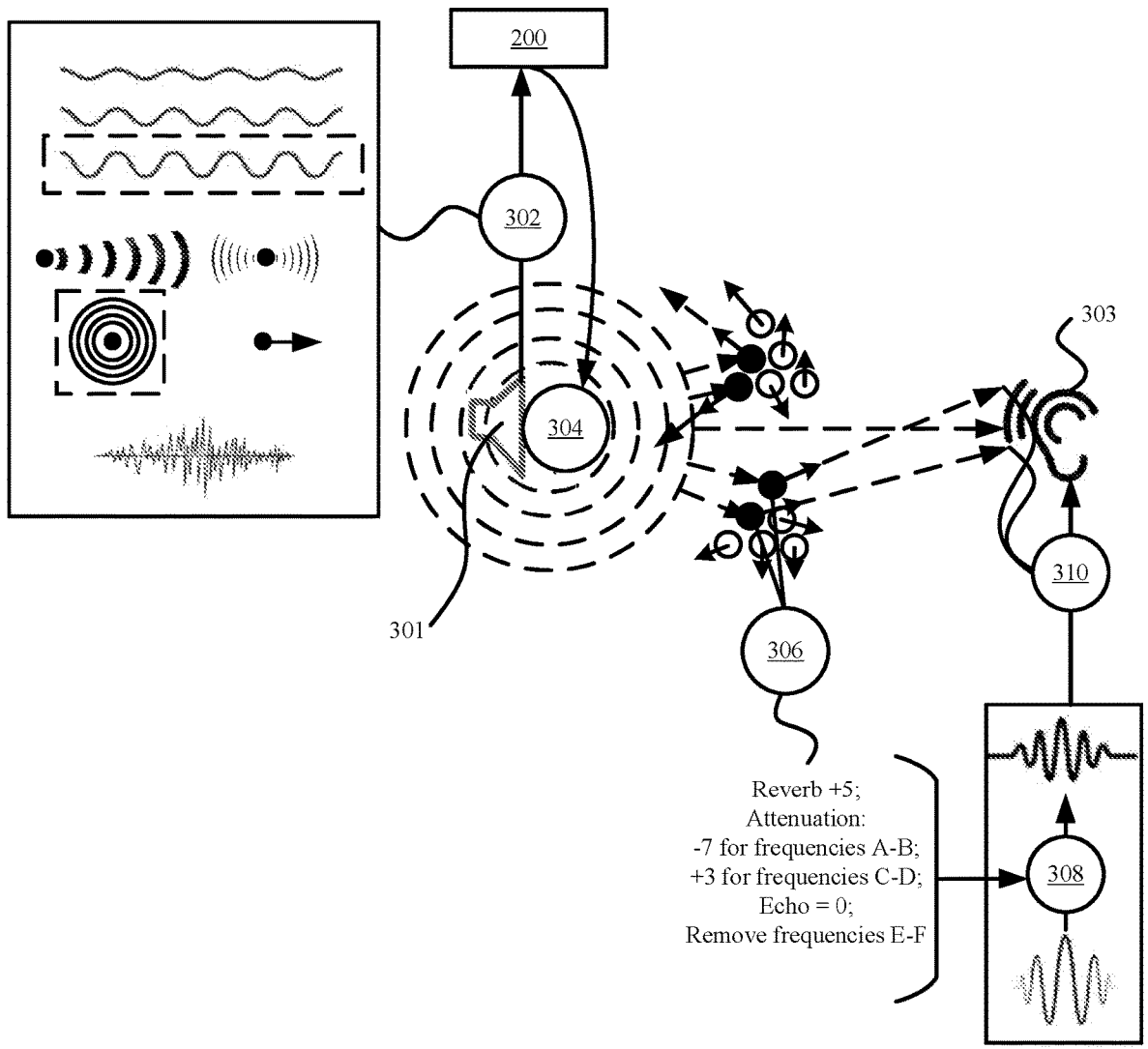
FIG. 3 illustrates an example of adjusting sound from a sound source on a calculated path to a listening position based on the positions, audio normals, and/or acoustic characteristics of point cloud points in accordance with some embodiments presented herein.

FIG. 3 illustrates an example of adjusting sound from a sound source on a calculated path to a listening position based on the positions, audio normals, and/or acoustic characteristics of point cloud points in accordance with some embodiments presented herein. Point cloud sound system 200 determines (at 302) properties of the sound that emanates from sound source 301. The sound properties may include the direction of the sound (e.g., directional, ambient, etc.), the propagation pattern with which the sound travels, and/or the sound characteristics (e.g., frequencies, pitch, tone, volume, etc.). The sound properties may be stored in a file or data structure associated with sound source 301. For instance, sounds from different sound sources or different sounds from the same sound source may propagate with different focused or distribution patterns, in one or more directions, and/or with different sound characteristics.

Point cloud sound system 200 calculates (at 304) a path by which sound from sound source 301 reaches listening position 303 based on the position of sound source 301, the determined (at 302) properties of the sound, and reflections to the sound by point cloud points along the path. The reflections and/or the changes in the sound path may be calculated based on the audio normals of the contacted points along the path. Since the sound may be simulated as an expanding wave or signal, point cloud sound system 200 may calculate (at 304) multiple paths as the sound wave expands the further it propagates from sound source 301 and for the expanding sound wave reflecting off different points in the 3D space. The audio normals may specify redirecting the sound in a single direction or in multiple directions and/or forms. For instance, the audio normals may specify reflecting the sound in all directions (e.g., an ambient reflection) or in one or more angles of the shape formed by the points in the sound path.

Point cloud sound system 200 detects which point cloud points are in the path between sound source 301 and listening position 303. Some point cloud points may be in the sound path, but the sound may reflect off these other points and away from listening position 303 such that the points have no effect on the sound that is heard at listening position 303. Accordingly, point cloud sound system 200 may ignore points in a sound path that does not reach listening position 303.

Point cloud sound system 200 selects (at 306) the acoustic characteristics of the points in the path between sound source 301 and listening position 303, and adjusts (at 308) the sound based on the selected (at 306) acoustic characteristics of the points in the path to listening position 303 and/or the points that the sound reflects off in the calculated (at 304) path from sound source 301 to listening position 303. Adjusting (at 308) the sound may include calculating the effects that the acoustic characteristics of the points in the path to listening position 303 have on the sound. The effects may adjust the sound volume, modify certain frequencies, add echo, add reverberation, offset frequencies relative to one another, attenuate certain frequencies, change pitch, change tone, and/or change other sound properties.

Point cloud sound system 200 plays (at 310) the adjusted sound that reaches listening position 303. The adjusted sound accurately simulates the sound that a listener at listening position 303 would hear, thereby providing a greater sense of realism to the 3D scene. For instance, if listening position 303 changes from an unobstructed first position that is directly in front of sound source 301 to an obstructed second position with a large solid object in between the listening position 303 and sound source 301, point cloud sound system 200 would change from playing (at 310) the original sound emanating from sound source 301 at the unobstructed first position to playing (at 310) an adjusted sound that modifies the original sound at the obstructed second position according to the acoustic characteristics defined for the points representing the large solid object.

The propagating nature of the sound and the density of points in a point cloud may result in a large number of calculations. For instance, the sound may reach, reflect, or pass through thousands of different points before arriving at the listening position, and may result in thousands of adjustments being applied to the sound. The number of calculations increase with each additional sound or sound source that is added to the 3D environment.

To reduce the computational effort associated with adjusting the sound based on acoustic characteristics of points in the sound path, point cloud sound system 200 may define a multi-point sound primitive to determine changes in the sound path caused by the sound contacting any of a related set of points, to represent the acoustic characteristics of the related set of points, and to adjust sound based on the acoustic characteristics of the multi-point sound primitive rather than each point in the related set of points that the sound may contact (e.g., reach, reflect off, or pass through). There is no or unnoticeable loss in the fidelity, quality, or accuracy of the sound that is adjusted based on the acoustic characteristics of the multi-point sound primitive since the multi-point cloud primitive is defined with the same or similar acoustic characteristics as the related set of points. As such, there is no difference or an insignificant difference when adjusting sound based on the acoustic characteristics of the multi-point sound primitive rather than the acoustic characteristics of each individual point in the related set of points. However, the computational effort is greatly reduced because point cloud sound system 200 performs a single adjustment based on the acoustic characteristics of the multi-point sound primitive rather than separate adjustments based on the acoustic characteristics of each point in the related set of points.

Figure 4:
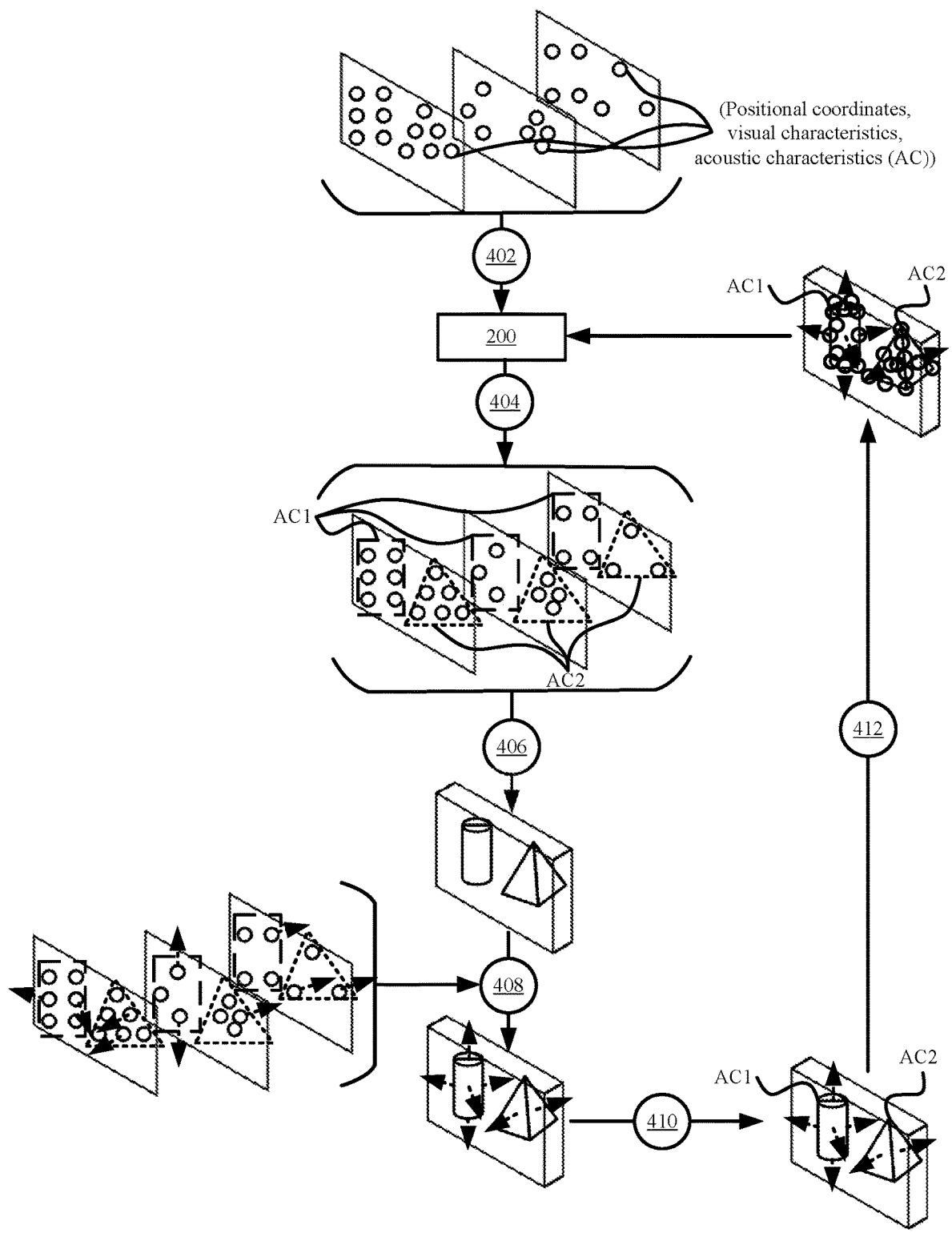
FIG. 4 illustrates an example of defining a multi-point sound primitive in accordance with some embodiments presented herein.

FIG. 4 illustrates an example of defining a multi-point sound primitive in accordance with some embodiments presented herein. Point cloud sound system 200 receives (at 402) a spatial audio integrated point cloud. The points of the spatial audio integrated point cloud may be defined with positional coordinates, visual characteristics, and acoustic characteristics. The acoustic characteristics specify how sound is affected when contacting the point defined with those acoustic characteristics.

Point cloud sound system 200 scans the point elements and selects (at 404) each set of points from the spatial audio integrated point cloud that are positioned next to at least one other point in that set of points and that have the same or related acoustic characteristics. Related acoustic characteristics include acoustic characteristics that differ by less than a threshold amount. For instance, a first point that reflects sound frequencies in the range of 100-150 Hertz has related acoustic characteristics with a neighboring second point that reflects sound frequencies in the range of 90-140 Hertz, whereas a third point that neighbors the first point and that reflects sound frequencies in the range of 1-2 Kilohertz does not have related acoustic characteristics with either the first point or the second point.

In some embodiments, point cloud sound system 200 selects (at 404) the set of points based on other non-positional elements of the points. In some such embodiments, point cloud sound system 200 may select (at 404) the set of points to include neighboring points in the 3D space of the point cloud that are defined with the same or related materials or material properties. For instance, points that represent the same or related metallic surfaces as indicated by the material or material property non-positional element of "metal", "aluminum", and/or "steel" may have or may be mapped to the same acoustic characteristics. Similarly, points with material or material property non-positional elements defined with "rigid" and "metal" values may be associated with the same acoustic characteristics.

Point cloud sound system 200 generates (at 406) a multi-point sound primitive in the shape of each selected (at 404) set of points. Point cloud sound system 200 may analyze the positioning of a selected (at 404) set of points and may generate a shape to span the volume, area, or region that is spanned by that selected (at 404) set of points. In some embodiments, point cloud sound system 200 may define the shape for the multi-point sound primitive by configuring parameters of a shape-generating function or expression. In some embodiments, point cloud sound system 200 may select a configurable shape that best approximates or matches the shape formed by the selected (at 404) set of points and may modify the configurable shape to more closely match or fit the shape formed by the selected (at 404) set of points. In some embodiments, the multi-point sound primitive is defined as a simple cube, sphere, cone, cylinder, or other basic 3D shape. In some such embodiments, the multi-point sound primitive may span a volume or region that is slightly bigger, smaller, or mismatched with the volume or region spanned by the selected (at 404) set of points. To further reduce the complexity of the multi-point primitive, point cloud sound system 200 may select (at 404) the set of points to include points that form or are positioned about the exterior or outer surface of a 3D object, and may define (at 406) the multi-point sound primitive to have a 2D shape (e.g., a square, rectangle, circle, curved plane, etc.) in the form of the selected points about the exterior or outer surface of the 3D object. In any case, the multi-point sound primitive spans or covers two or more points of the point cloud.

Point cloud sound system 200 defines (at 408) the sound reactivity of each multi-point sound primitive based on the audio normals of the selected (at 404) set of points that were used to generate that multi-point sound primitive. The sound reactivity may define the direction or angle at which the multi-point sound primitive reflects sound or adjusts the direction of sound coming into contact with the multi-point sound primitive. In some embodiments, point cloud sound system 200 defines (at 408) a single audio normal for each side or surface of the multi-point sound primitive based on the audio normals of the points from the selected (at 404) set of points that are positioned or that form that side of the multi-point sound primitive. Point cloud sound system 200 may generate the audio normal for a 2D multi-point sound primitive by averaging the directions or angles of the audio normals defined for the selected (at 404) set of points.

Point cloud sound system 200 defines (at 410) the acoustic characteristics of each multi-point sound primitive based on the acoustic characteristics of the selected (at 404) set of points that were used to generate that multi-point sound primitive. In some embodiments, point cloud sound system 200 may define (at 408) the acoustic characteristics of a multi-point sound primitive using the average or mean values defined for the acoustic characteristics of the set of points. In some other embodiments, point cloud sound system 200 may define (at 408) the acoustic characteristics of a multi-point sound primitive based on the acoustic characteristics of the point from the selected (at 404) set of points at the center of the shape defined for the multi-point sound primitive.

Point cloud sound system 200 associates (at 412) each multi-point sound primitive to the selected (at 404) set of points that were used to generate that multi-point sound primitive so that sound reaching or reflecting off one or more of the selected (at 404) set of points is determined and calculated based on the shape and acoustic characteristics of the multi-point sound primitive rather than the individual points in the set of points. Associating (at 412) the multi-point sound primitive may include anchoring, attaching, or otherwise linking the position of the multi-point sound primitive to the position of one or more points from the selected (at 404) set of points. In some embodiments, the multi-point sound primitive is defined with its own coordinates in the 3D space of the point cloud based on the coordinates of the selected (at 404) set of points.

In any case, point cloud sound system 200 uses the positioning of the multi-point sound primitive to determine sound from a sound source that comes into contact with any point of the set of points on its path to a listening position, and uses the acoustic characteristics of that multi-point sound primitive to adjust the sound. Point cloud sound system 200 performs a single uniform adjustment to sound that comes into contact with any position about the multi-point sound primitive on its path to a listening position.

Figure 5:
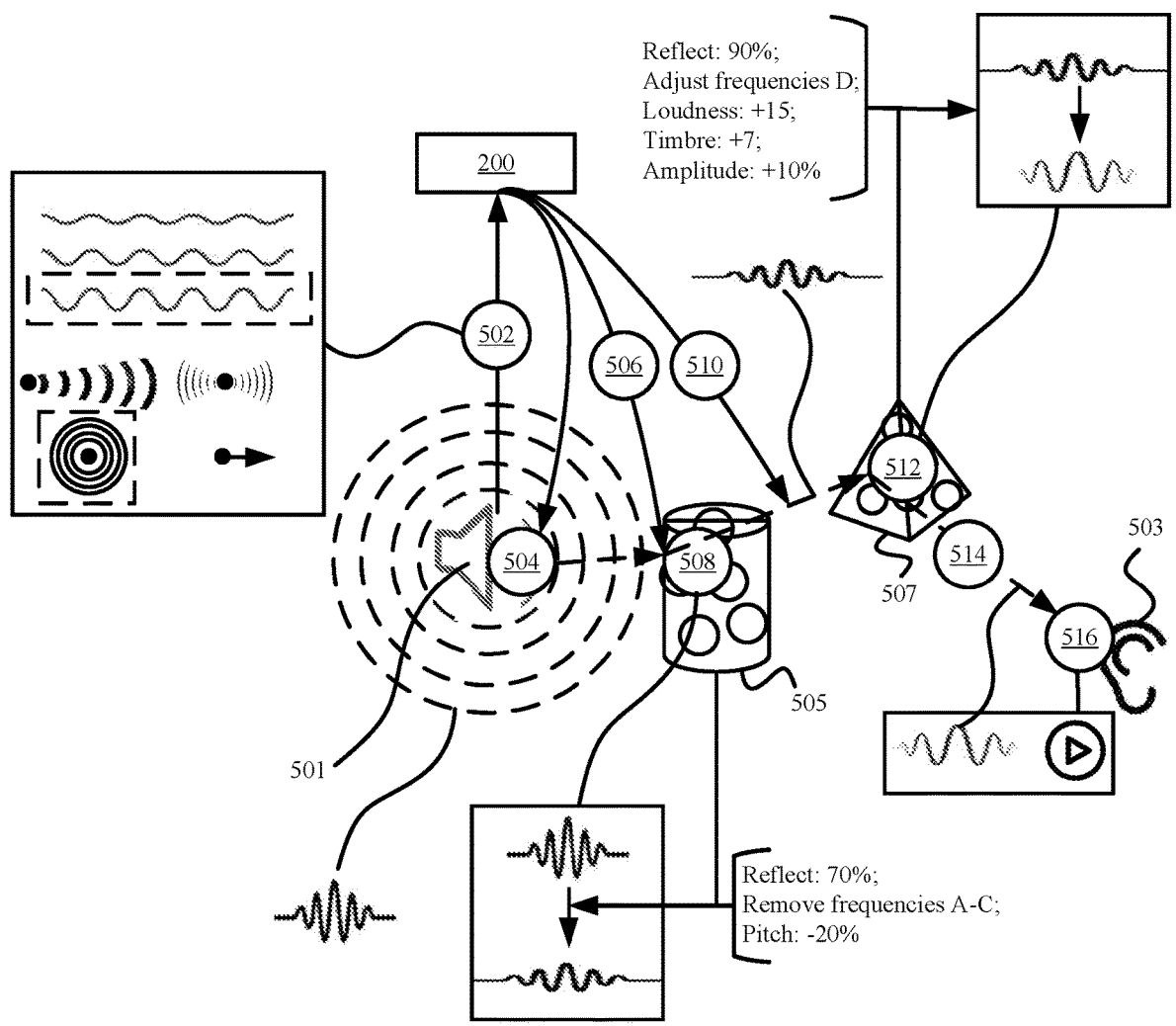
FIG. 5 illustrates an example of adjusting sound using the multi-point sound primitive in accordance with some embodiments presented herein.

FIG. 5 illustrates an example of adjusting sound using the multi-point sound primitive in accordance with some embodiments presented herein. Point cloud sound system 200 tracks (at 502) the properties of sound originating from sound source 501, and also tracks (at 504) the direction or path of the sound to listening position 503 in a 3D scene that is populated with one or more 3D objects defined by points of a spatial sound integrated point cloud. The sound properties may indicate that the sound propagates and/or expands in the tracked (at 504) direction as an expanding wave, that the sound expands outward or in various directions as it moves in the tracked (at 504) direction, or that the sound remains focused as a beam as it moves in the tracked (at 504) direction.

Point cloud sound system 200 determines (at 506) that the sound propagates towards and reflects off first multi-point sound primitive 505. Specifically, point cloud sound system 200 tracks the position of the sound in the 3D space of a 3D environment populated with various spatial sound integrated point clouds according to the tracked (at 502) properties and the tracked (at 504) direction, compares the sound positions to positions of multi-point sound primitives 505 and 507 defined for different sets of points from the various spatial sound integrated point clouds, and detects that the sound travels to a position in the 3D space that is spanned or occupied by first multi-point sound primitive 505.

Point cloud sound system 200 adjusts (at 508) the sound properties according to the acoustic characteristics of first multi-point sound primitive 505. For instance, the acoustic characteristics may add reverberation, may attenuate, may modify certain frequencies, and/or other alter the sound to simulate the effects of the sound coming into contact with the surface that is represented by the set of points linked to or associated with the first multi-point sound primitive.

Point cloud sound system 200 continues tracking (at 510) the adjusted sound in the 3D space based on the audio normal that is defined for first multi-point sound primitive 505. Point cloud sound system 200 determines the angle and/or direction with which the adjusted sound reflects off the surface of first multi-point sound primitive 505 based on the audio normal that is defined for first multi-point sound primitive 505.

Point cloud sound system 200 determines that the adjusted sound propagates towards and reflects off second multi-point sound primitive 507 that is positioned in the tracked (at 510) path of the adjusted sound reflecting off first multi-point sound primitive 505. Point cloud sound system 200 performs (at 512) a second adjustment of the already adjusted sound properties based on the acoustic characteristics of second multi-point sound primitive 507.

Point cloud sound system 200 continues tracking (at 514) the sound adjusted by the acoustic characteristics of first multi-point sound primitive 505 and the acoustic characteristics of second multi-point sound primitive 507 in the 3D space based on the audio normal that is defined for second multi-point sound primitive 507, and determines that the adjusted sound reaches listening position 503. Point cloud sound system 200 plays or provides (at 516) the sound that was first adjusted by the acoustic characteristics of first multi-point sound primitive 505 and that was also adjusted by the acoustic characteristics of second multi-point sound primitive 507 at listening position 503 in response to tracking (at 514) the adjusted sound arriving at or reaching listening position 503.

Point cloud sound system 200 efficiently computes the spatial sound for the 3D environment presented in FIG. 5 because changes in the sound path are determined based on the audio normals of the larger multi-point sound primitives rather than each of several points spanned by the larger multi-point sound primitives. Moreover, a single adjustment is made to the propagating sound in response to the sound reaching any position about the defined surface, volume, or region of a multi-point sound primitive rather than computing separate adjustments for each point of a set of points that the sound wave comes into contact with.

In some embodiments, point cloud sound system 200 may use a tree structure to represent the positioning of the multi-point sound primitives in the 3D space of a 3D scene or 3D environment that is populated with one or more spatial audio integrated point clouds. The tree structure may provide a partitioned representation of the 3D space, and each leaf node of the tree structure may be associated with one or more multi-point sound primitives that are positioned in the partitioned region of space represented by that leaf node. The tree structure simplifies the detection of sound reaching a multi-point sound primitive. Specifically, point cloud sound system 200 may track the position of the sound and may traverse the tree structure based on the sound position to determine if a leaf node with an associated multi-point sound primitive is defined at the sound position. If the leaf node is associated with a multi-point sound primitive, then point cloud sound system 200 may adjust the sound according to the acoustic characteristics of that multi-point sound primitive and may alter the sound path according to the audio normal of that multi-point sound primitive.

Figure 6:
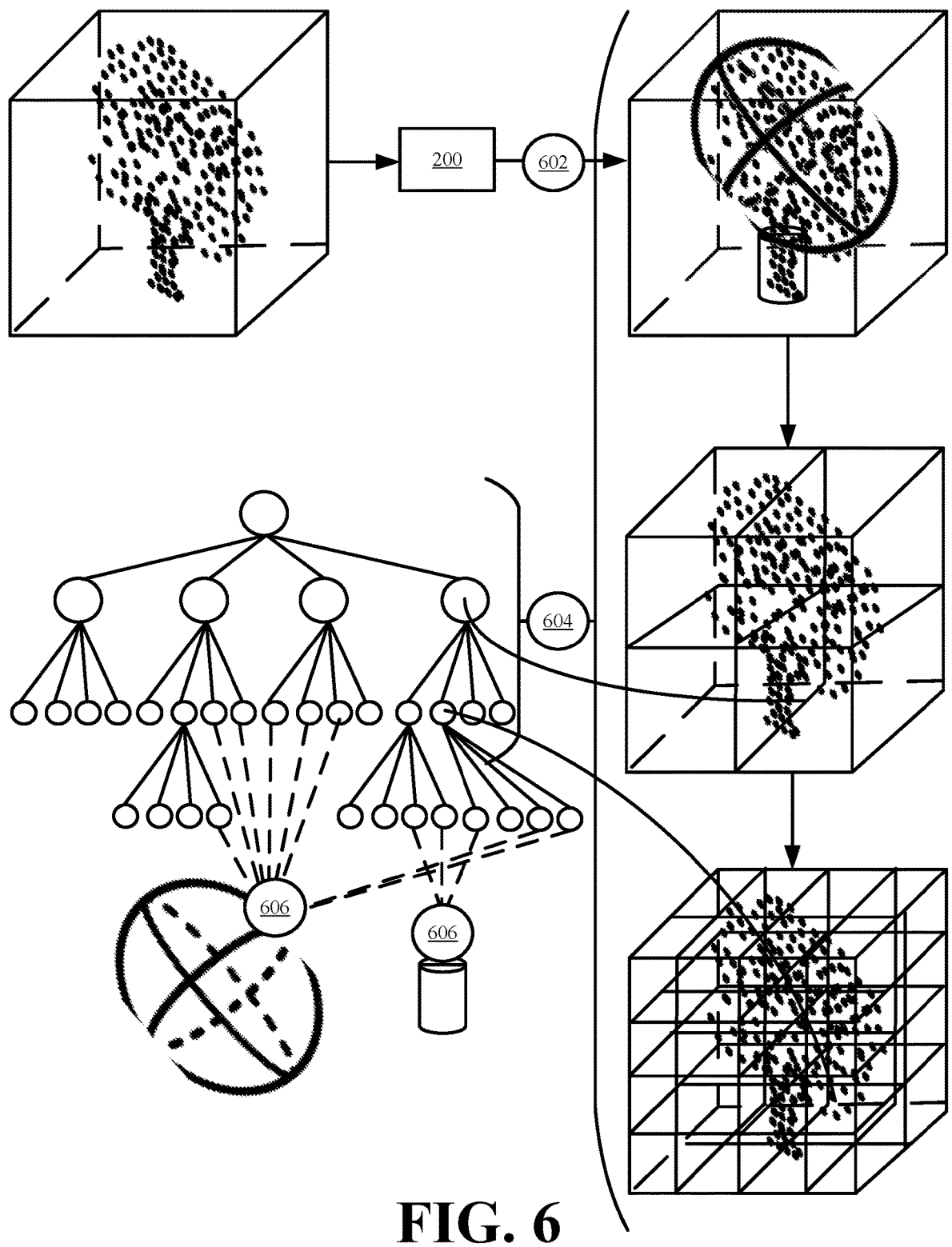
FIG. 6 illustrates an example tree structure for multi-point sound primitives defined for a 3D scene that is constructed with points of a point cloud in accordance with some embodiments presented herein.

FIG. 6 illustrates an example tree structure for multi-point sound primitives defined for a 3D scene that is constructed with points of a point cloud in accordance with some embodiments presented herein. Point cloud sound system 200 defines (at 602) the multi-point sound primitives for different sets of points of the point cloud that have the same or similar acoustic characteristics. Defining (at 602) the multi-point sound primitives includes associating each multi-point sound primitive to the region of space that is spanned by the set of points having the acoustic characteristics from which the multi-point sound primitive is defined.

In the example of FIG. 6, point cloud sound system 200 defines (at 602) a sphere as a first multi-point sound primitive to represent the acoustic characteristics for a first set of points that form leaves of a tree, and defines (at 602) a cylinder as a second multi-point sound primitive to represent the acoustic characteristics for a second set of points that form the tree trunk.

Point cloud sound system 200 generates (at 604) the tree structure for the multi-point sound primitives by partitioning the 3D scene spanned by the point cloud into progressively smaller sized region. In generating a binary tree structure, point cloud sound system 200 defines the root node of the tree structure to represent the entirety of the 3D scene and each layer under the root node layer divides the regions represented by a node in an immediately higher layer in half. In generating an octree structure, point cloud sound system 200 defines the root node of the tree structure to represent the entirety of the 3D scene and each layer under the root node layer divides the regions represented by a node in any immediately higher layer into eight subregions.

In some embodiments, point cloud sound system 200 continues subdividing the 3D scene and generating lower layer nodes for the tree structure until the regions spanned by the lowest level nodes are about equal in size to the shapes, volumes, areas, or surfaces represented by each of the defined (at 602) multi-point sound primitives. For instance, point cloud sound system 200 defines a leaf node of the tree structure when the subdivided region spanned by that leaf node is also spanned by a particular multi-point sound primitive. In some other embodiments, point cloud sound system 200 subdivides the 3D scene and generates lower layer nodes for the tree structure until the volume or region spanned by the lowest level nodes are entirely within or outside a volume or region spanned by a defined (at 602) multi-point sound primitive.

Point cloud sound system 200 associates or links (at 606) a multi-point sound primitive to a leaf node of the tree structure when the subdivided region spanned by that leaf node is fully within a volume or region spanned by that multi-point sound primitive. Associating or linking (at 606) the multi-point sound primitive may include adding a pointer or index of the associated multi-point sound primitive to the leaf node with the leaf node mapping to a particular subdivided volume or region of 3D space.

When performing the sound adjustment, point cloud sound system 200 may track the position of sound emanating from a sound source in the 3D scene, and may traverse the tree structure based on the tracked position to determine if the sound reaches a subdivided region of a leaf node that is associated with a multi-point sound primitive. The traversal of the tree structure reduces the number of computations or comparisons that are performed in order to determine if the sound reaches a multi-point sound. For instance, if the sound is moving through a large subdivided region that is represented by a particular node and none of the leaf nodes directly or indirectly linked to the particular node are associated with a multi-point sound primitive, then point cloud sound system 200 may avoid further traversals down the tree structure and/or comparisons between the sound position and the positions, volumes, or regions spanned by any multi-point sound primitive. Stated differently, the traversal of the tree structure immediately identifies which multi-point sound primitive may affect the sound such that point cloud sound system 200 does not need to sort and/or compare the positions, volumes, or regions spanned by each multi-point sound primitive to the tracked sound position.

Figure 7:
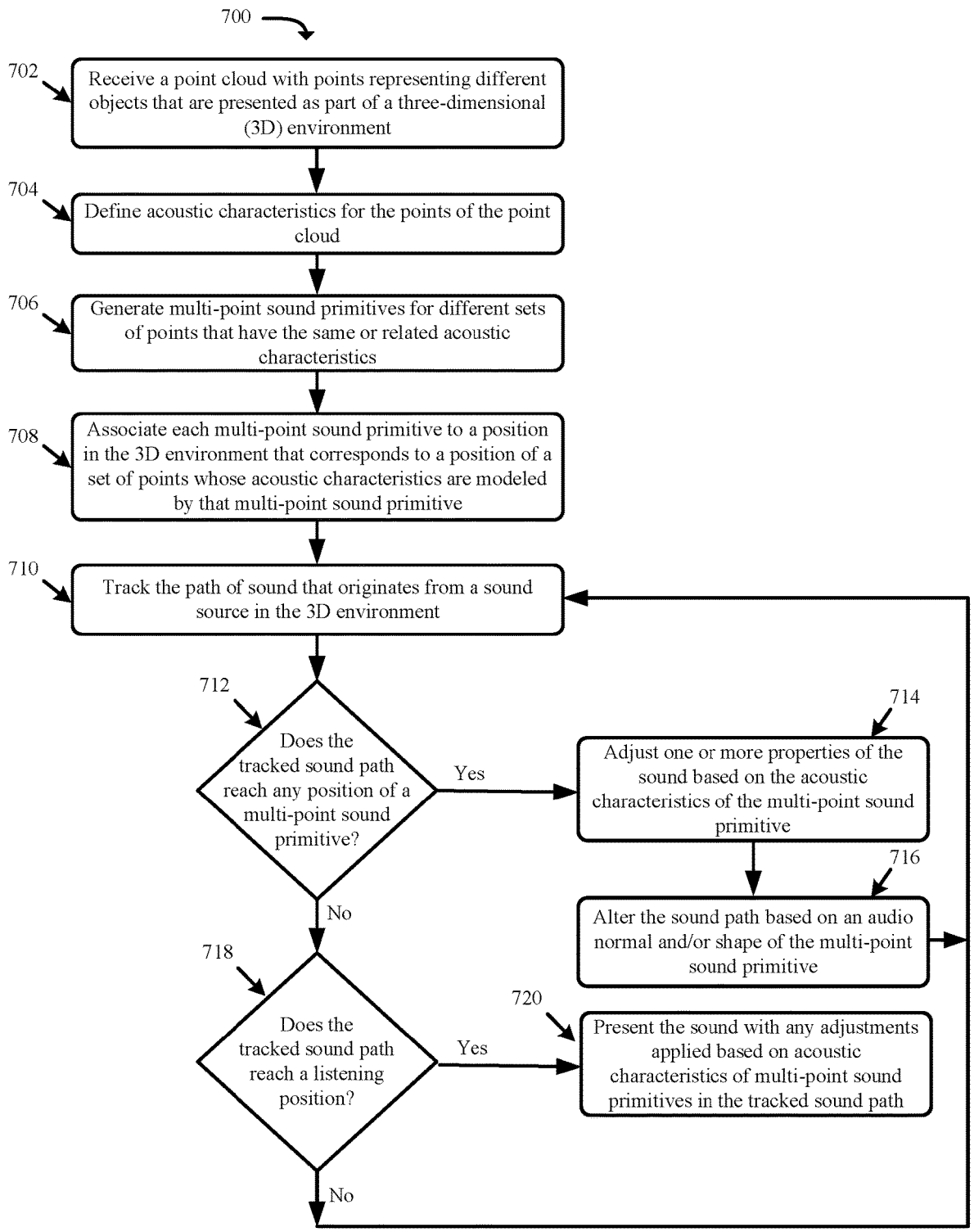
FIG. 7 presents a process for generating accurate spatial audio effects by adjusting sound in a 3D environment that is populated with points of one or more point clouds in accordance with some embodiments presented herein.

FIG. 7 presents a process 700 for generating accurate spatial audio effects by adjusting sound in a 3D environment that is populated with points of one or more point clouds in accordance with some embodiments presented herein. Process 700 is implemented by point cloud sound system 200.

Point cloud sound system 200 may include one or more devices or machines with processor, memory, storage, network, and/or other hardware resources that generate the realistic spatial sound for the 3D environment by simulating the effects that various digital or virtual objects represented by different sets of points in the 3D environment have on sound traveling from a sound source to a listening position in the 3D environment. Point cloud sound system 200 may be a standalone sound engine or a sound engine that is integrated as part of other systems (e.g., a graphics system) for generating the 3D environment visualizations. For instance, point cloud sound system 200 may be part of a game engine that generates the graphics for a 3D game based on the points of one or more point cloud and that generates realistic sound effects for the game elements. In some embodiments, point cloud sound system 200 is integrated as part of a virtual reality, mixed reality, augmented reality, or other spatial computing system, and generates the spatial audio effects for the presented environments.

Process 700 includes receiving (at 702) a point cloud with points representing different objects that are presented as part of the 3D environment. The point cloud may be a visual 3D model that is not defined with any acoustic characteristics that affect sound.

Process 700 includes defining (at 704) acoustic characteristics for the points of the point cloud. Point cloud sound system 200 may automatically define (at 704) the acoustic characteristics based on other properties or non-positional elements of the points. In some embodiments, point cloud sound system 200 defines (at 704) the acoustic characteristics for the points based on the existing materials or material properties defined for the points. In some such embodiments, point cloud sound system 200 maps each material or material property to a different set of acoustic characteristics, and defines (at 704) the acoustic characteristics of the points based on the mapping. For instance, point cloud sound system 200 may define (at 704) a first set of acoustic characteristics for a first point that is defined with the material of "metal", and may define (at 704) a second set of acoustic characteristics for a second point that is defined with the material "rubber" and material property of "elastic". In some embodiments, point cloud sound system 200 may use color values with or without material or material property values in defining (at 704) the acoustic characteristics. For instance, certain colors may be representative of surfaces with a first set of acoustic characteristics, and other colors may be representative of surfaces with a second set of acoustic characteristics. Similarly, the density, distribution, and/or structural positioning of the points as represented by the positional coordinates may be associated with or mapped to different acoustic characteristics. For instance, a densely distributed set of points forming a smooth surface may be defined with a first set of acoustic characteristics, whereas a sparsely distributed set of points arranged with a particular lattice structure may be defined with a second set of acoustic characteristics. In some other embodiments, point cloud sound system 200 may define (at 704) the acoustic characteristics using artificial intelligence and/or machine learning techniques. In some such embodiments, point cloud sound system 200 may render the points of the point cloud, perform a classification of the rendered visualization via pattern, object, and/or image recognition techniques, and assign the acoustic characteristics of the points based on the classification. For instance, the rendered point cloud may produce an image of an armored vehicle or character. The AI/ML techniques may classify the points as being associated with the material of "metal", and point cloud sound system 200 may associate acoustic characteristics to the points based on the material classification. In still some other embodiments, a user may manually select different sets of points from the point cloud and specify the acoustic characteristics to apply or assign to the selected sets of points.

The acoustic characteristics are values that are added to the point definition, and may specify how different sound frequencies are affected when colliding with or coming into contact with the point cloud points that are defined with those acoustic characteristics. The sound effects defined by the acoustic characteristics may include specifying an amount by which certain frequencies are absorbed or reflected, adjustments to apply to different frequencies, adding echo, reverberation, distortion, changing tone, timbre adjustments, amplitude adjustments, loudness adjustments, and/or specifying other changes to the sound or sound properties.

Process 700 includes generating (at 706) multi-point sound primitives for different sets of points that have the same or related acoustic characteristics. Generating (at 706) the multi-point sound primitive includes defining a shape, form, or other primitive to represent the acoustic characteristics for two or more points. In other words, the multi-point sound primitive is a single primitive that spans a larger volume or region of space than any single point of the point cloud, and sound propagating in the 3D environment may be compared against the single multi-point sound primitive rather than each point of a set of points represented by that single multi-point sound primitive. Moreover, the sound reaching a multi-point sound primitive may be adjusted once based on the acoustic characteristics of the single multi-point sound primitive rather than redundantly or separately adjusted based on the acoustic characteristics of each point from the set of points the sound makes contact with.

Process 700 includes associating (at 708) each multi-point sound primitive to one or more positions in the 3D environment that correspond to the positions of a different set of points whose acoustic characteristics are modeled by that multi-point sound primitive. Associating (at 708) each multi-point sound primitive may include linking the multi-point sound primitive position to the position of one or more points from the represented set of points so that the multi-point sound primitive moves in conjunction with any movements of the represented set of points. In other words, if the represented set of points are moved in the 3D environment, the same movement is applied to the position of the associated (at 708) multi-point sound primitive. Similarly, if the points are transformed by a function, the same function may be applied to transform the shape of the multi-point sound primitive.

Process 700 includes tracking (at 710) the path of sound that originates from a sound source in the 3D environment. Tracking (at 710) the sound path may include determining the direction and pattern with which sound from the sound source travels in the 3D environment, and determining any changes to the direction or pattern caused by sound contacting virtual objects represented by points of the point cloud. In some embodiments, point cloud sound system 200 may use mathematical formulas to model the propagation of sound and track the sound path.

Process 700 includes determining (at 712) whether the tracked path collides with, comes into contact with, and/or reaches a multi-point sound primitive. For instance, Point cloud sound system 200 determines (at 712) the position of any of the sound waves match a position about the volume, region, surface, or area of a particular multi-point sound primitive.

In response to determining (at 712—Yes) that the tracked path reaches a multi-point sound primitive, process 700 includes adjusting (at 714) one or more properties of the sound based on the acoustic characteristics of the multi-point sound primitive. Process 700 includes altering (at 716) the sound path based on an audio normal and/or shape of the multi-point sound primitive. If the multi-point sound primitive is not solid or allows sound to pass through, then altering (at 716) the sound path may include slowing the propagation of the adjusted sound or tracking the path of the adjusted sound passing through the multi-point sound primitive. If the multi-point sound primitive is solid or does not allow sound to pass through, then altering (at 716) the sound path may include calculating an amount and direction by which the adjusted sound reflects off the multi-point sound primitive based on the audio normal and/or acoustic characteristics of the multi-point sound primitive. Process 700 continues tracking (at 710) the path of the sound after it is adjusted and altered by the multi-point sound primitive.

In response to determining (at 712—No) that the tracked sound path does not collide, contact, or reach a multi-point sound primitive, process 700 includes determining (at 718) whether the tracked sound path reaches a listening position defined in the 3D environment. In some embodiments, the listening position corresponds to a position of a virtual camera, a render position, or a near-plane position. In some other embodiments, the listening position corresponds to a position of a playable character. In any case, the listening position corresponds to the position within the 3D environment at which the user hears sound originating from the various sound sources at different positions in the 3D environment.

In response to determining (at 718—Yes) that the sound reaches the listening position, process 700 includes presenting (at 720) the sound with any adjustments applied based on acoustic characteristics of multi-point sound primitives in the tracked sound path. Presenting (at 720) the sound may include playing the adjust sound through a speaker or other audio output device. In response to determining (at 718—No) that the sound does not reach the listening position, process 700 continues tracking (at 710) the sound path.

When there is too much variation in the acoustic characteristics of the point cloud points, the computational efficiency of the multi-point sound primitives may be reduced. In such cases, point cloud sound system 200 may generate several small-sized multi-point sound primitives that reduce the number of computations and sound adjustments relative to computations and sound adjustments performed using the acoustic characteristics of the points by only a small percentage.

Accordingly, in some embodiments, point cloud sound system 200 may generate a multi-point sound primitive based on different neighboring sets of points that have different acoustic characteristics. For instance, a first set of points may represent a metal screen mesh and a second set of points may be positioned directly behind the first set of points and may represent a solid wooden door. Sound may partially pass through the first set of points due to the spacing, density, distribution, or positioning and/or acoustic characteristics of the first set of points, and the sound adjusted by the acoustic characteristics of the first set of points may then be reflected by the second set of points.

Rather than define and associate a first multi-point sound primitive to the first set of points based on the acoustic characteristics of the first set of points and define and associate a second multi-point sound primitives to the second set of points based on the acoustic characteristics of the second set of points, point cloud sound system 200 may define a single multi-point sound primitive with acoustic characteristics that are derived from the acoustic characteristics of the first set of points and the second set of points, and may use the single multi-point sound primitive to simulate the effects that are imparted on sound passing through the metal screen mesh and reflecting off the solid wooden door.

Figure 8:
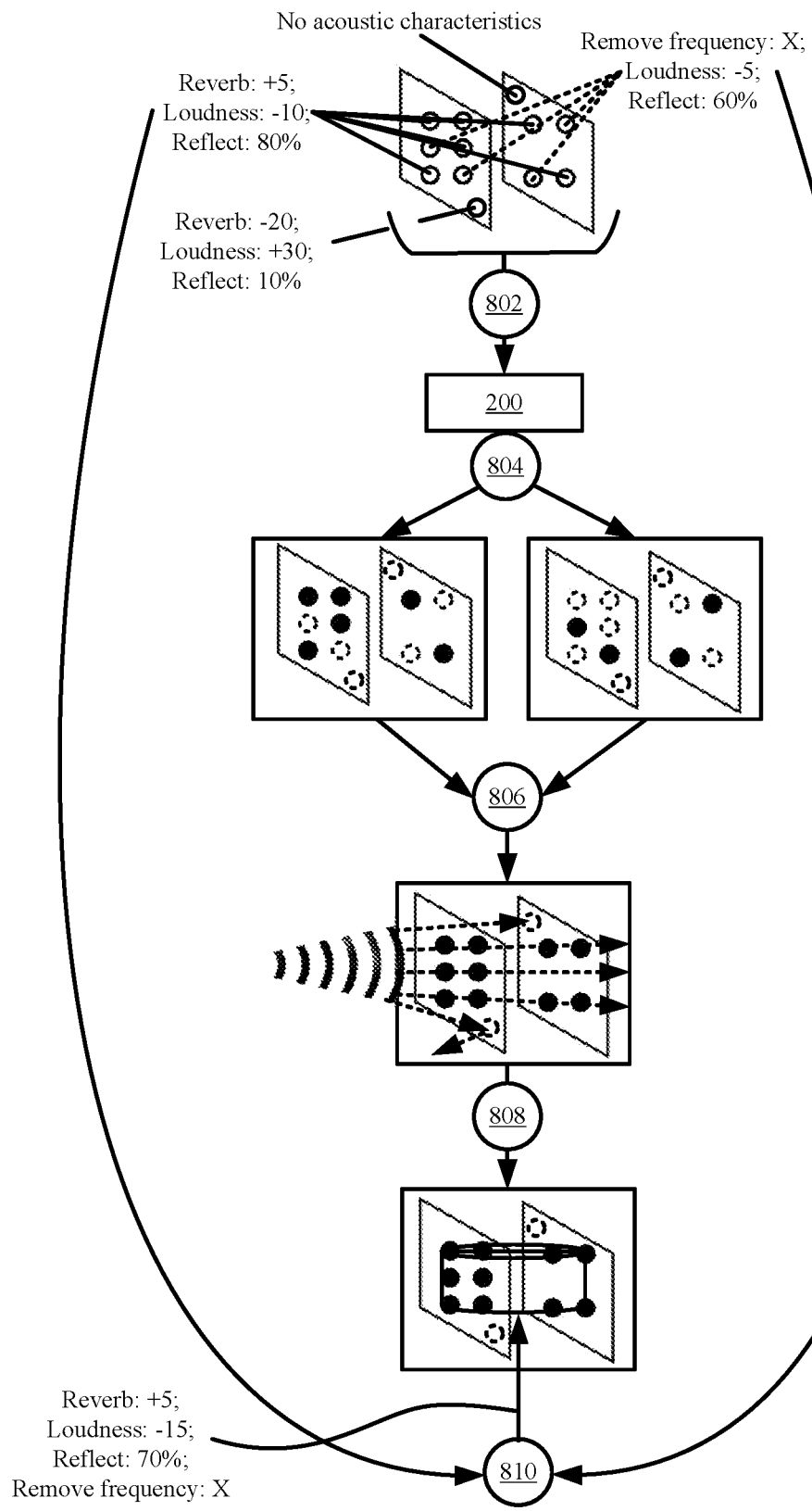
FIG. 8 illustrates an example of improving computational efficiency of the multi-point sound primitives by combining different acoustic characteristics of different sets of points in accordance with some embodiments presented herein.

FIG. 8 illustrates an example of improving computational efficiency of the multi-point sound primitives by combining different acoustic characteristics of different sets of points in accordance with some embodiments presented herein. Point cloud sound system 200 receives (at 802) a spatial audio integrated point cloud.

Point cloud sound system 200 analyzes the positioning and acoustic characteristics of the points to identify (at 804) sets of points that have the same or related acoustic characteristics. Point cloud sound system 200 also analyzes the distribution, density, audio normals, and/or acoustic characteristics of the different sets of points to determine (at 806) two or more sets of points with different acoustic characteristics that effect sound traveling along a particular path. For instance, sound traveling along the particular path may pass through each of the two or more sets of points and may be affected by the acoustic characteristics of each set of points as a result. Similarly, sound traveling along the particular path may partially pass through and be adjusted by a first set of points before being reflected and adjusted by a second set of points. The distribution and/or density associated with a set of points may reveal whether sound passes through or is reflected by that set of points. For instance, the distribution and/or density may specify whether the object represented by that set of points is solid or has gaps, holes, or other opening through which the sound may propagate through. From the distribution and/or density, point cloud sound system 200 may specify a percentage or amount by which the sound propagating through or to the multi-point sound primitive is affected by the acoustic characteristics of each set of points.

Point cloud sound system 200 selects two or more sets of points with different acoustic characteristics that are determined (at 806) to effect sound traveling in a path through the two or more sets of points. Point cloud sound system 200 generates (at 808) a single multi-point sound primitive that spans the volume or region spanned by the selected two or more sets of points.

Point cloud sound system 200 defines (at 810) the acoustic characteristics of the multi-point sound primitive based on the acoustic characteristics of the two or more sets of points. In some embodiments, point cloud sound system 200 determines the combined effect that the acoustic characteristics of the different sets of point have on sound, and defines a single set of acoustic characteristics to recreate the combined effect.

Point cloud sound system 200 associates the multi-point sound primitive to the two or more sets of points. Consequently, point cloud sound system 200 compares the tracked sound path against the volume or region spanned by the multi-point sound primitive rather than the position of each point in the two or more sets of points, and performs a single sound adjustment based on the acoustic characteristics of the multi-point sound primitive rather than separate adjustments based on the acoustic characteristics of each set of points from the two or more sets of points when the sound path reaches the multi-point sound primitive or the position of the two or more sets of points.

Figure 9:
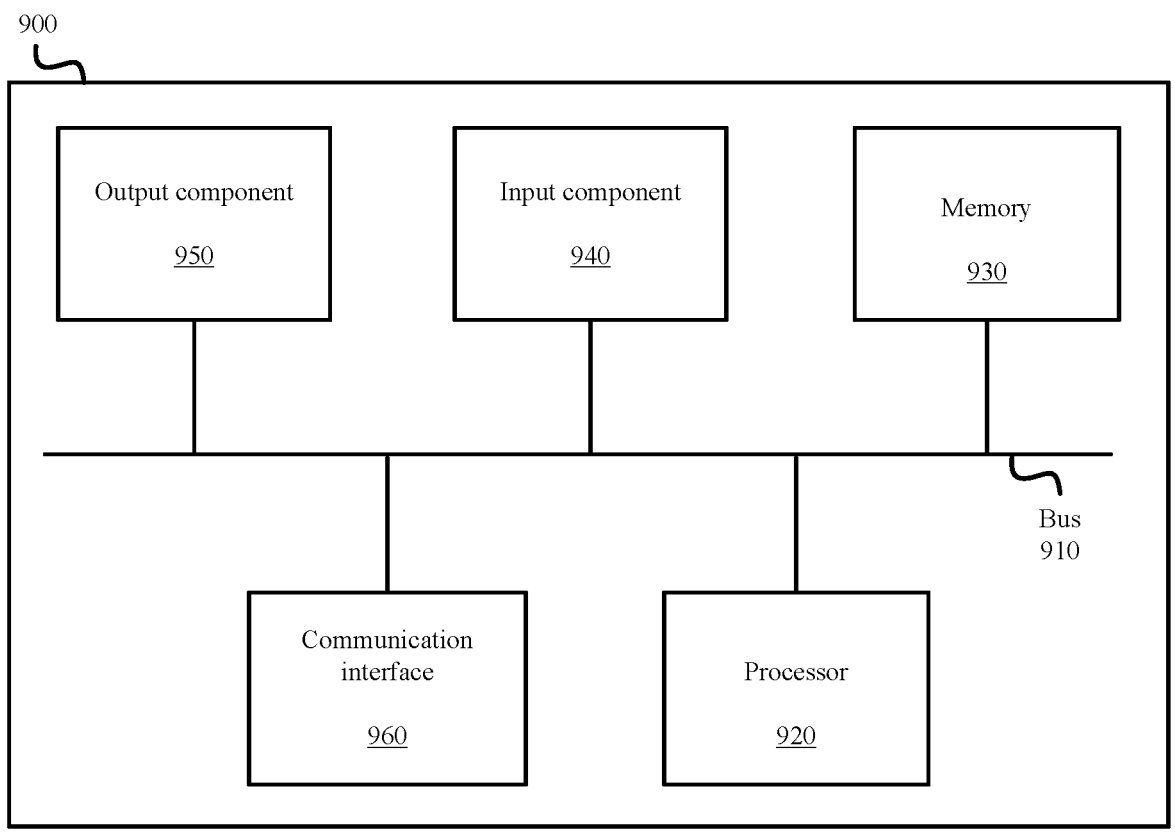
FIG. 9 illustrates example components of one or more devices, according to one or more embodiments described herein.

FIG. 9 is a diagram of example components of device 900. Device 900 may be used to implement one or more of the tools, devices, or systems described above (e.g., point cloud sound system 200 or other systems and devices used to render the 3D scenes or environments with the simulated spatial audio). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method for accurately simulating sound in a virtual three-dimensional (3D) scene, the method comprising:
   generating the virtual 3D scene with one or more digital objects rendered from a plurality of points that are distributed to different positions in the virtual 3D scene;
   tracking a path with which a sound emitted from a sound source propagates through the virtual 3D scene;
   determining that the sound via the path reaches a position of one or more points from the plurality of points; and
   performing a first adjustment to the sound according to acoustic characteristics of the one or more points, wherein performing the first adjustment comprises modifying the sound before playback of the sound at a listening position at an end of the path based on the acoustic characteristics specifying different sound frequencies that are absorbed or reflected by the one or more points.

2. The method of claim 1 further comprising:
   determining that the path continues to the listening position after reaching the one or more points; and
   playing a modified sound that is adjusted according to the acoustic characteristics in response to the path reaching the listening position.

3. The method of claim 1 further comprising:
   adjusting the path with which the sound propagates through the virtual 3D scene after reaching the position of the one or more points based on an audio normal of the one or more points.

4. The method of claim 1 further comprising:
   determining that the one or more points are part of a set of points from the plurality of points with common acoustic characteristics;
   generating a multi-point sound primitive spanning the different positions of the set of points in the virtual 3D scene;
   defining acoustic characteristics of the multi-point sound primitive based on the common acoustic characteristics of the set of points; and
   using the multi-point sound primitive instead of the different positions of the set of points in determining that the sound reaches the position of the one or more points.

5. The method of claim 4, wherein determining that the sound reaches the position of the one or more points comprises:
   detecting that the path contacts a position about a region spanned by the multi-point sound primitive.

6. The method of claim 5, wherein performing the first adjustment further comprises:
   modifying one or more properties of the sound based on the common acoustic characteristics of the multi-point sound primitive.

7. The method of claim 4, wherein generating the multi-point sound primitive comprises:
   defining a shape that spans the different positions of the set of points; and associating the shape in the virtual 3D scene at the different positions of the set of points.

8. The method of claim 4, wherein using the multi-point sound primitive comprises:
comparing a propagating position of the sound to a region of the virtual 3D scene that is spanned by the multi-point sound primitive and that overlaps with the different positions of the set of points.

9. The method of claim 1, wherein each particular point of the plurality of points is defined with:
positional coordinates for a position of the particular point in the 3D scene;
visual characteristics that are rendered at the position of the particular point; and
acoustic characteristics that specify adjustments to one or more properties of the sound coming into contact with the particular point at the position defined by the positional coordinates.

10. The method of claim 1 further comprising:
determining that the one or more points are part of a set of points from the plurality of points with common acoustic characteristics;
associating a shape that spans the different positions of the set of points to the set of points; and
wherein determining that the sound reaches the position of the one or more points comprises:
detecting a position about the path at which the sound makes contact with the shape.

11. The method of claim 10 further comprising:
defining an audio normal to the shape based on an audio normal of at least one point from the set of points; and
modifying the path based on the audio normal of the shape at the position about the path at which the sound makes contact with the shape.

12. The method of claim 1 further comprising:
receiving properties with which the sound emanates from the sound source; and
calculating the path based on the properties.

13. The method of claim 1, wherein performing the first adjustment further comprises:
changing one or more of a reverberation, attenuation, frequency, loudness, timbre, amplitude, and amount of the sound based on the acoustic characteristics.

14. The method of claim 1 further comprising:
determining that the path reaches a position of at least a second point from the plurality of points after reflecting off of or passing past the one or more points; and
performing a second adjustment to the sound according to acoustic characteristics of at least the second point.

15. The method of claim 14, wherein performing the second adjustment comprises:
generating an adjusted sound that is first adjusted according to the acoustic characteristics of the one or more points and that is subsequently adjusted according to the acoustic characteristics of at least the second point.

16. A sound system for accurately simulating sound in a virtual three-dimensional (3D) scene, the sound system comprising:
one or more hardware processors configured to:
generate the virtual 3D scene with one or more digital objects rendered from a plurality of points that are distributed to different positions in the virtual 3D scene;
track a path with which a sound emitted from a sound source propagates through the virtual 3D scene;
determine that the sound via the path reaches a position of one or more points from the plurality of points; and
perform a first adjustment to the sound according to acoustic characteristics of the one or more points, wherein performing the first adjustment comprises modifying the sound before playback of the sound at a listening position at an end of the path based on the acoustic characteristics specifying different sound frequencies that are absorbed or reflected by the one or more points.

17. The sound system of claim 16, wherein the one or more hardware processors are further configured to:
determine that the path continues to the listening position after reaching the one or more points; and
play a modified sound that is adjusted according to the acoustic characteristics in response to the path reaching the listening position.

18. The sound system of claim 16, wherein the one or more hardware processors are further configured to:
adjust the path with which the sound propagates through the virtual 3D scene after reaching the position of the one or more points based on an audio normal of the one or more points.

19. The sound system of claim 16, wherein the one or more hardware processors are further configured to:
determine that the one or more points are part of a set of points from the plurality of points with common acoustic characteristics;
generate a multi-point sound primitive spanning the different positions of the set of points in the virtual 3D scene;
define acoustic characteristics of the multi-point sound primitive based on the common acoustic characteristics of the set of points; and
use the multi-point sound primitive instead of the different positions of the set of points in determining that the sound reaches the position of the one or more points.

20. A non-transitory computer-readable medium storing instructions that, when executed by one or more processors of a sound system, cause the sound system to perform operations comprising:
generating a virtual three-dimensional (3D) scene with one or more digital objects rendered from a plurality of points that are distributed to different positions in the virtual 3D scene;
tracking a path with which a sound emitted from a sound source propagates through the virtual 3D scene;
determining that the sound via the path reaches a position of one or more points from the plurality of points; and
performing a first adjustment to the sound according to acoustic characteristics of the one or more points, wherein performing the first adjustment comprises modifying the sound before playback of the sound at a listening position at an end of the path based on the acoustic characteristics specifying different sound frequencies that are absorbed or reflected by the one or more points.

* * * * *